US009790916B2

United States Patent
Valero Lafuente

(10) Patent No.: US 9,790,916 B2
(45) Date of Patent: Oct. 17, 2017

(54) WIND TURBINE

(75) Inventor: Sebastian Valero Lafuente, Cornellà de Llobregat (ES)

(73) Assignee: ALSTOM Renewable Technologies, Grenoble (FR)

( * ) Notice: Subject to any disclaimer, the term of this patent is extended or adjusted under 35 U.S.C. 154(b) by 816 days.

(21) Appl. No.: 14/005,541

(22) PCT Filed: Mar. 30, 2012

(86) PCT No.: PCT/EP2012/055763
§ 371 (c)(1),
(2), (4) Date: Sep. 16, 2013

(87) PCT Pub. No.: WO2012/131024
PCT Pub. Date: Oct. 4, 2012

(65) Prior Publication Data
US 2014/0003943 A1    Jan. 2, 2014

Related U.S. Application Data

(60) Provisional application No. 61/538,231, filed on Sep. 23, 2011.

(30) Foreign Application Priority Data

Mar. 31, 2011   (EP) .................................... 11382089

(51) Int. Cl.
*F03D 1/00*   (2006.01)
*F03D 80/00*  (2016.01)
*F03D 80/50*  (2016.01)

(52) U.S. Cl.
CPC ............. *F03D 1/003* (2013.01); *F03D 80/00* (2016.05); *F03D 80/50* (2016.05);
(Continued)

(58) Field of Classification Search
CPC .......... F03D 1/003; F03D 1/005; F03D 11/00; F03D 9/00; F03D 80/00; F03D 80/50;
(Continued)

(56) References Cited

U.S. PATENT DOCUMENTS 4,757,211 A * 7/1988 Kristensen .............. F03D 11/00
                                                              290/44
8,721,258 B2 * 5/2014 Eriksen ................... F03D 80/50
                                                              415/4.3
(Continued)

FOREIGN PATENT DOCUMENTS

DE            10015287          10/2001
DE       102004030929 B3        10/2005
(Continued)

OTHER PUBLICATIONS

Machine translation WO 20100031528 Mar. 2010.*
Machine Translation DE 102004030929 Oct. 2005.*

*Primary Examiner* — Craig Kim
*Assistant Examiner* — Maxime Adjagbe
(74) *Attorney, Agent, or Firm* — Dority & Manning, P.A.

(57) ABSTRACT

Wind turbine comprising a hub carrying a plurality of blades, the hub being rotatably mounted on a frame, the frame extending forward into the hub, wherein the frame comprises a manhole arranged in an upper side of the portion of the frame extending forward into the hub and the frame being dimensioned such that an average-size adult human can move around through it at least up to the manhole.

15 Claims, 15 Drawing Sheets

(52) U.S. Cl.
CPC ... *F05B 2220/7066* (2013.01); *F05B 2230/80* (2013.01); *F05B 2240/916* (2013.01); *Y02E 10/725* (2013.01); *Y02E 10/726* (2013.01); *Y02E 10/728* (2013.01); *Y02P 70/523* (2015.11)

(58) Field of Classification Search
CPC ... Y02E 10/726; Y02E 10/722; Y02E 10/728; Y02E 10/725; F05B 2240/916; F05B 2220/7066
USPC ........................................ 290/44, 43, 54, 55
See application file for complete search history.

(56) References Cited

U.S. PATENT DOCUMENTS

| | | | | |
|---|---|---|---|---|
| 2008/0272604 | A1* | 11/2008 | Versteegh | F03D 1/0666 290/55 |
| 2010/0011575 | A1* | 1/2010 | Numajiri | F03D 1/001 29/889.1 |
| 2010/0264664 | A1* | 10/2010 | Lauke | F03D 11/0008 290/55 |
| 2011/0285137 | A1* | 11/2011 | Casazza | F03D 9/002 290/55 |

FOREIGN PATENT DOCUMENTS

| | | |
|---|---|---|
| DE | 102008063783 | 6/2010 |
| EP | 0864748 | 9/1998 |
| EP | 1677007 | 7/2006 |
| WO | WO 2008/069818 | 6/2008 |
| WO | WO 2010/024510 | 3/2010 |
| WO | WO 20100031528 * | 3/2010 |

* cited by examiner

WIND TURBINE

This application claims the benefit of European Patent Application EP 11382089.4 filed on Mar. 31, 2011 and U.S. Provisional Patent Application Ser. No. 61/538,231 filed on Sep. 23, 2011.

The present invention relates to a wind turbine.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

In most conventional wind turbines, the rotor hub is mounted on one end of the rotor shaft. The rotor shaft is rotatably mounted in a support structure within the nacelle on top of the wind turbine tower. The rotor thus forms an overhanging structure which transmits torque, but additionally transmits cyclical bending loads due to the loads on the blades and the weight of the hub and blades.

In the case of direct drive turbines, these bending loads can be transmitted to the generator causing air gap variations. Elimination of the gearbox in the drive train takes away an important potential source of failure. Additionally, direct drive wind turbines offer other potential advantages such as simplifying the nacelle systems, increasing reliability, and increasing efficiency.

US 20100264664 discloses a generator arrangement for a direct drive wind turbine comprising a hub with a plurality of blades, the hub being rotatably mounted relative to a support tube. The support tube may be provided with an extension mounted to the front end of the support tube. The extension may be provided with a manhole arranged between the two bearings on which the extension is mounted and via which manhole service personnel can enter the hub.

Some disadvantages of this kind of configuration relate to maintenance, i.e. handling components that need to be repaired or replaced, and to the evacuation of injured service personnel. Such operations are particularly complicated as the height of the extension of the support tube is quite low. Said working space (the extension of the support tube) may also be substantially reduced by hoisting means provided in the support tube for lowering or pulling out equipment housed inside the hub through the manhole. The available space in the support tube for service personnel may thus be relatively reduced.

SUMMARY OF THE INVENTION

It is an object of the present invention to at least partially overcome some of above mentioned drawbacks.

In a first aspect, the invention provides a wind turbine comprising a hub carrying a plurality of blades, the hub being rotatably mounted on a frame, the frame extending forward into the hub, wherein the frame comprises a manhole arranged in an upper side of the portion of the frame extending forward into the hub and the frame being dimensioned such that an average-size adult human can move around through it at least up to the manhole.

All throughout the present description and claims, the term manhole should be interpreted as an opening through which a person can gain access into e.g. parts of machinery e.g. for cleaning or repairing.

According to this aspect, the provision of the manhole in the upper side of the frame may facilitate the ergonomics of access to and exit from the hub, both for equipment and for personnel; e.g. evacuation of an injured person using e.g. a stretcher that can be placed just below the manhole may be facilitated.

In addition, the manhole arranged in the upper side of the frame facilitates moving large and heavy components, such as pitch motors, automatic lubrication systems, and electric and battery boxes, between the hub and the nacelle as e.g. the hoisting means for pulling out the equipments can now be arranged inside the hub.

A further advantage of the manhole arranged in the upper side of the frame relates to working conditions for personnel carrying out inspection and maintenance tasks inside the hub. If a three bladed wind turbine is stopped in a "Y" configuration, then the height of the space between the two blades pointing upwards in the "Y" configuration can be used in combination with the height of the portion of the frame extending forward into the hub.

In some embodiments, the frame extending forward into the hub may further comprise a transport system arranged in a lower portion of the frame extending forward into the hub.

The transport system has a synergistic effect with the manhole arranged in the upper side of the portion of the frame extending forward into the hub. The transport system in combination with the manhole results in a simple and fast transport of large and heavy components housed e.g. inside the hub to and from the proximal end of the frame.

In some embodiments, the transport system may comprise a pair of rails extending from a proximal end of the frame to at least the manhole, a trolley that can move on the pair of rails and driving means for the trolley.

Thus, the combination of the manhole arranged in the upper side of the portion of the frame extending forward into the hub and the transport system entails that either large and heavy components normally housed in the hub or an injured person can be conveyed to the proximal end of the frame in a fast, easy and safe manner. This arrangement may further be combined with any suitable conventional crane, lift or hoisting means provided in the nacelle for lifting and lowering loads from and to the ground.

In some embodiments, the pair of rails of the transport system may extend up to a distal end of the portion of the frame extending forward into the hub. In these cases, above mentioned advantages and effects can also be applicable to components housed inside the spinner and/or an injured person working in that area.

In some embodiments, the hub may comprise a substantially tubular inner stiffening structure arranged between a front end and a rear end of the hub, coaxially arranged around the frame. The inner stiffening structure may comprise at least one opening of at least substantially the same dimensions as the manhole provided in the upper side of the frame.

In some embodiments, the portion of the frame extending forward into the hub may have a tapered shape. In others, it may be cylindrically shaped.

In some embodiments, the distal end of the frame may be inside the hub beyond substantially two thirds of the diameter of the hub.

In other embodiments, the distal end of the frame may be in front of the hub and the portion of the frame extending forward into the hub may completely traverse the hub.

Additionally in this aspect, the portion of the frame extending forward into the hub may comprise a partition at its distal end, the partition may comprise an access opening providing access to a spinner of the wind turbine mounted on the hub and the access opening may be suitable for an average-size adult human. Thus, the tunnel defined by said portion of the frame extending forward into the hub may be temporary closed at its distal end depending upon necessities, e.g. when maintenances tasks are being carried out inside the hub only and there is no intention to access the spinner and service personnel may not have to be cautious of an open distal end.

In some embodiments, the frame may be dimensioned such that an average-size adult human can move around through it up to its distal end.

In some embodiments the hub may comprise at least one openable door arranged on an external wall of the hub. Such an openable door can be used as an alternative escape route in case of an emergency inside the wind turbine.

Further in this aspect, when carrying out maintenance tasks in a wind turbine, it is desired that the blades are stopped in a "Y" configuration wherein the manhole, arranged in the upper side portion of the frame extending forward into the hub, remains between the two blades pointing upwards in the "Y" configuration as a relatively large space is thus available. In addition, since the hub is a cast piece, the space between the two blades pointing upwards in a "Y" configuration is a structurally robust area. Thus, such a "Y" configuration favors e.g. the hanging of hoisting means for manipulating components to and from the hub through the manhole.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1:
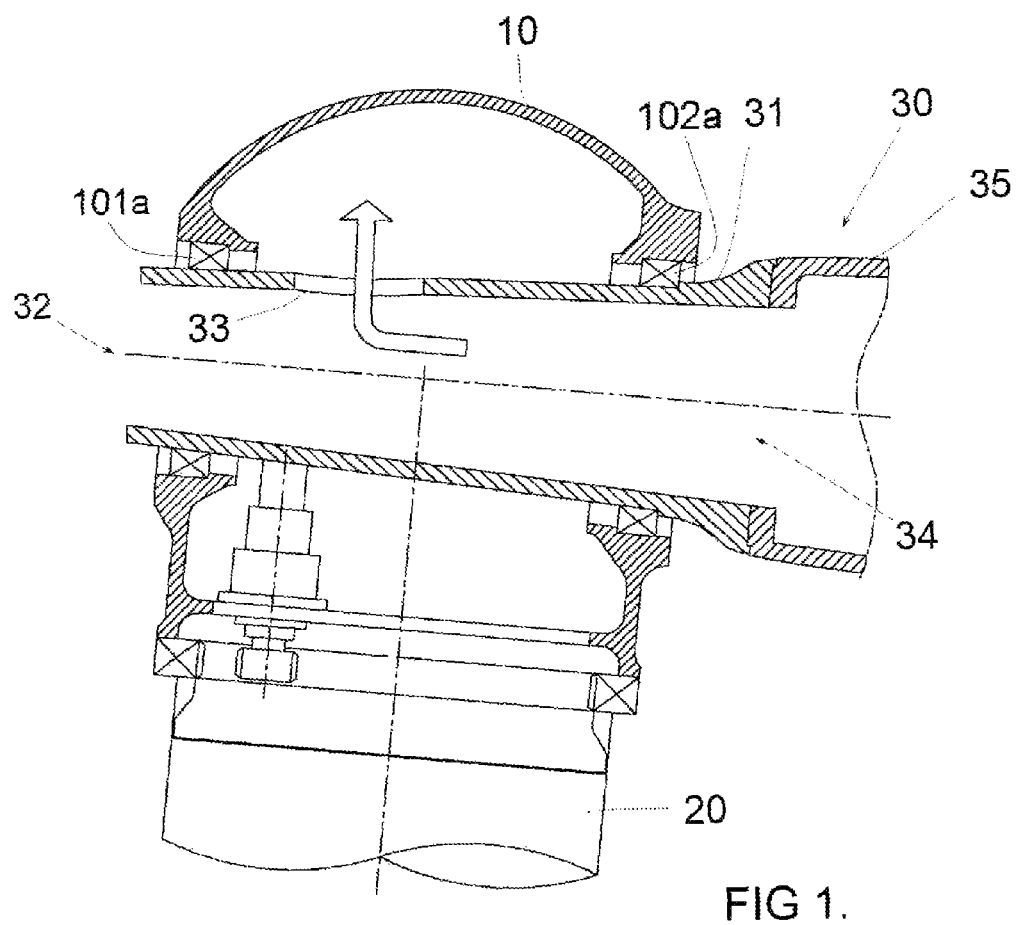
FIG. 1 illustrates a cross-section of the hub portion of a wind turbine according to a first embodiment of the present invention.

FIG. 1 illustrates a cross-section of the hub portion of a wind turbine according to an embodiment of the present invention wherein the wind turbine comprises a hub 10 carrying at least one blade 20. The hub 10 is rotatably mounted on a frame 30 comprising a portion 31 extending forward into the hub 10. The portion 31 of the frame extending forward into the hub 10 comprises a distal end 32 with respect to the nacelle or the wind turbine tower.

As shown in FIG. 1, the portion 31 of the frame extending forward into the hub 10 comprises a manhole 33 arranged in an upper side of the portion 31 of the frame extending forward into the hub 10.

According to this embodiment, the distal end 32 may be in front of the hub 10, the portion 31 of the frame extending forward into the hub 10 may completely traverse the hub 10 and the distal end 32 of the frame 30 may be open.

Further in FIG. 1, the portion 31 of the frame extending forward into the hub 10 may have a tapered shape and it may be dimensioned such that an average-size adult human can move around through it. In some embodiments, an average-size adult human can move around through the frame up to its distal end 32; in others, at least up to the manhole 33.

In FIG. 1, the hub 10 is rotatably mounted on the portion 31 of the frame extending forward into the hub through suitable bearings 101a and 102a arranged at a front end and a rear end (reference signs 101 and 102 of FIG. 2) of the hub 10. In general, in embodiments with such a bearing arrangement, a manhole 33 as hereinbefore described may be provided all along the portion 31 of the frame extending forward 31 into the hub, between said bearings 101a and 102a supporting the hub 10.

In general terms, the manhole may have different sizes. The structural strength of the manhole and frame depend on the size and location of the manhole in the frame. In some embodiments reinforcement may be provided for enhancing structural properties of the manhole.

Further, the shape of the manhole may vary. Generally, the shape of the manhole may be rounded. In some embodiments, it may be circular. In others, it may be elliptical.

Figure 2:
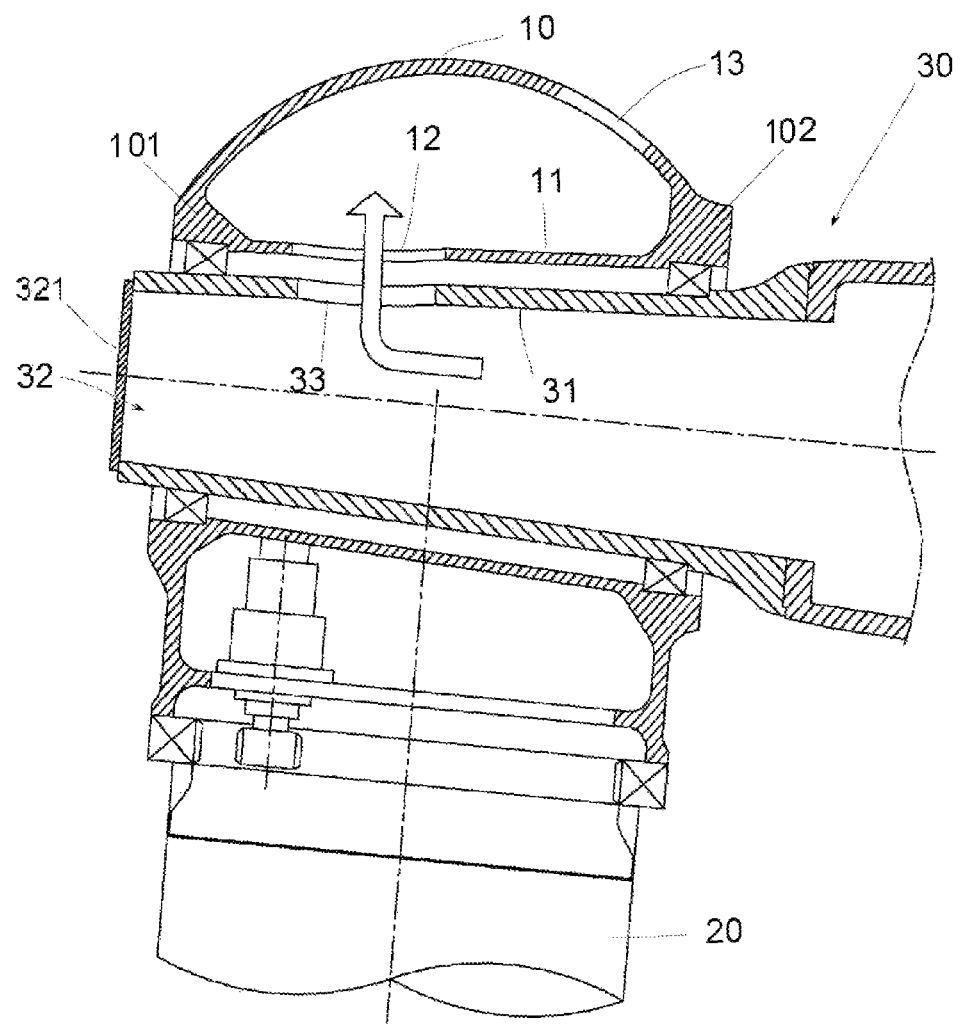
FIG. 2 illustrates a cross-section of the hub portion of a wind turbine according to a second embodiment of the present invention.

FIG. 2 illustrates a cross-section of the hub 10 of a wind turbine according to another embodiment of the present invention, wherein the hub 10, rotatably mounted on a frame 30, comprises a portion 31 extending forward into the hub and an inner stiffening structure 11. The inner stiffening structure 11 may be coaxially arranged around said portion 31 of the frame between a front end 101 and a rear end 102 of the hub 10. The inner stiffening structure 11 may comprise at least one opening 12 of at least substantially the same size as the manhole 33 provided in the upper side of said portion 31 of the frame. In use, when the hub is in an appropriate position (e.g. shown in FIG. 2), the at least one opening 12 provided in the inner stiffening structure 11 of the hub 10 matches the manhole 33 provided in the frame 30. The hub 10 may thus be accessible through the manhole 33 and the opening 12.

According to this embodiment, the distal end 32 of the frame 30 may comprise a partition 321. In some embodiments, the partition 321 may comprise an access opening or a door (not shown) to the spinner (not shown) of the wind turbine. The access opening to the spinner may be suitable for an average-size adult human.

As shown in FIG. 2, the opening 12 provided in the inner stiffening structure 11 may have substantially the same size as the manhole 33 provided in the upper side of the portion 31 of the frame extending forward into the hub 10. The size of the opening 12 provided in the inner stiffening structure 11 may be varied in accordance with circumstances and may e.g. also be bigger than the manhole 33.

Additionally, FIG. 2 shows an openable door 13 arranged on an external wall of the hub 10. Such openable door 13 may be used as an alternative escape route in case of an emergency inside the wind turbine. Said openable door 13 may be provided in all embodiments described herein.

Figure 3:
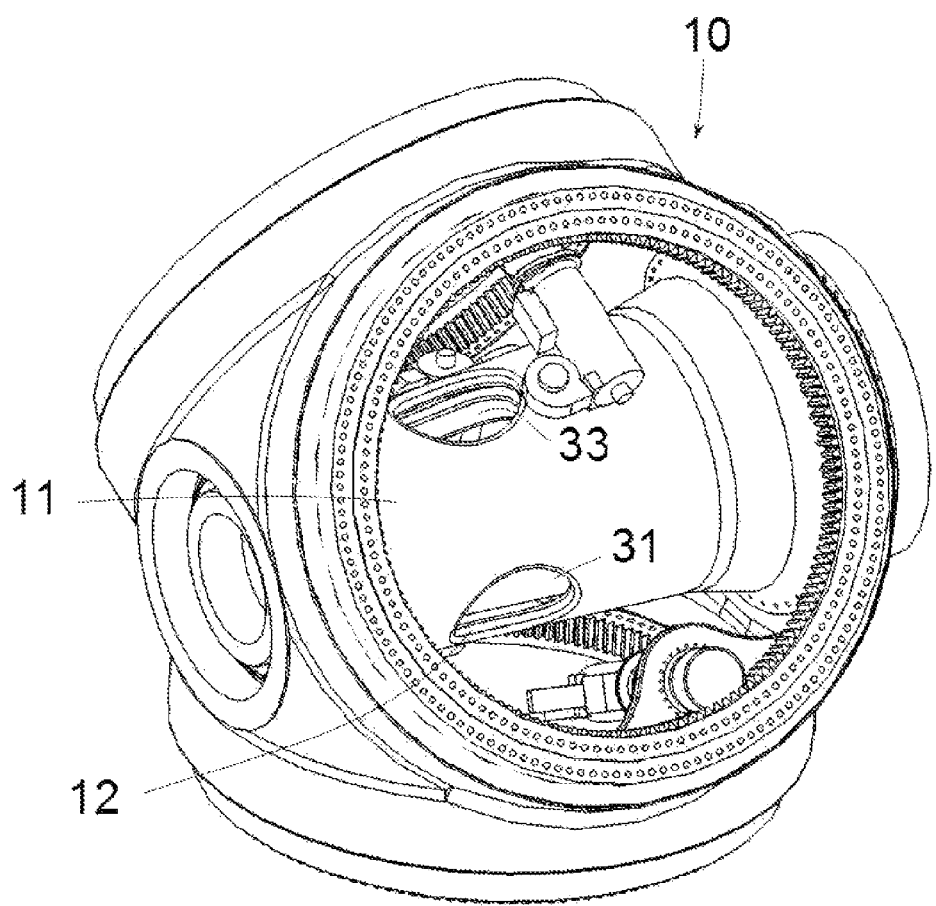
FIG. 3 illustrates a perspective view of the hub portion of a wind turbine according to another embodiment.

FIG. 3 illustrates a perspective view of the hub 10 according to an embodiment in which the inner stiffening structure 11 comprises three openings 12 (in FIG. 3 only two openings are visible) equidistantly spaced apart. The inner stiffening structure 11 may be coaxially arranged around the portion 31 of the frame extending forward into the hub 10, between a front end and a rear end of the hub (shown in FIG. 2). The stiffening structure 11 may have a tapered shape like the portion 31 of the frame around which it is arranged. The manhole 33 provided in the upper side of the portion 31 of the frame extending forward into the hub 10 and the openings 12 provided in the inner stiffening structure 11 may have an elliptical shape. In use, when the hub 10 is in an appropriate position (e.g. shown in FIG. 3), the manhole 33 arranged in an upper side of the portion 31 of the frame extending forward into the hub 10 may coincide with one of the openings 12 of the stiffening structure 11.

FIG. 3 shows the hub 10 in a maintenance position that may comprise arranging the blades in a "Y" configuration and leaving the manhole 33, arranged in the upper side of the frame between the two blades pointing upwards in the "Y" configuration. FIG. 3 does not show the blades itself, but the orifices in the hub for receiving the blades clearly show the "Y" configuration.

In FIG. 3, the tubular inner stiffening structure comprises three openings (for a three-bladed wind turbine). It should be understood that in those embodiments in which the hub comprises an inner stiffening structure, the stiffening structure may contain as many openings as desired as long as it contains at least one.

Figure 4:
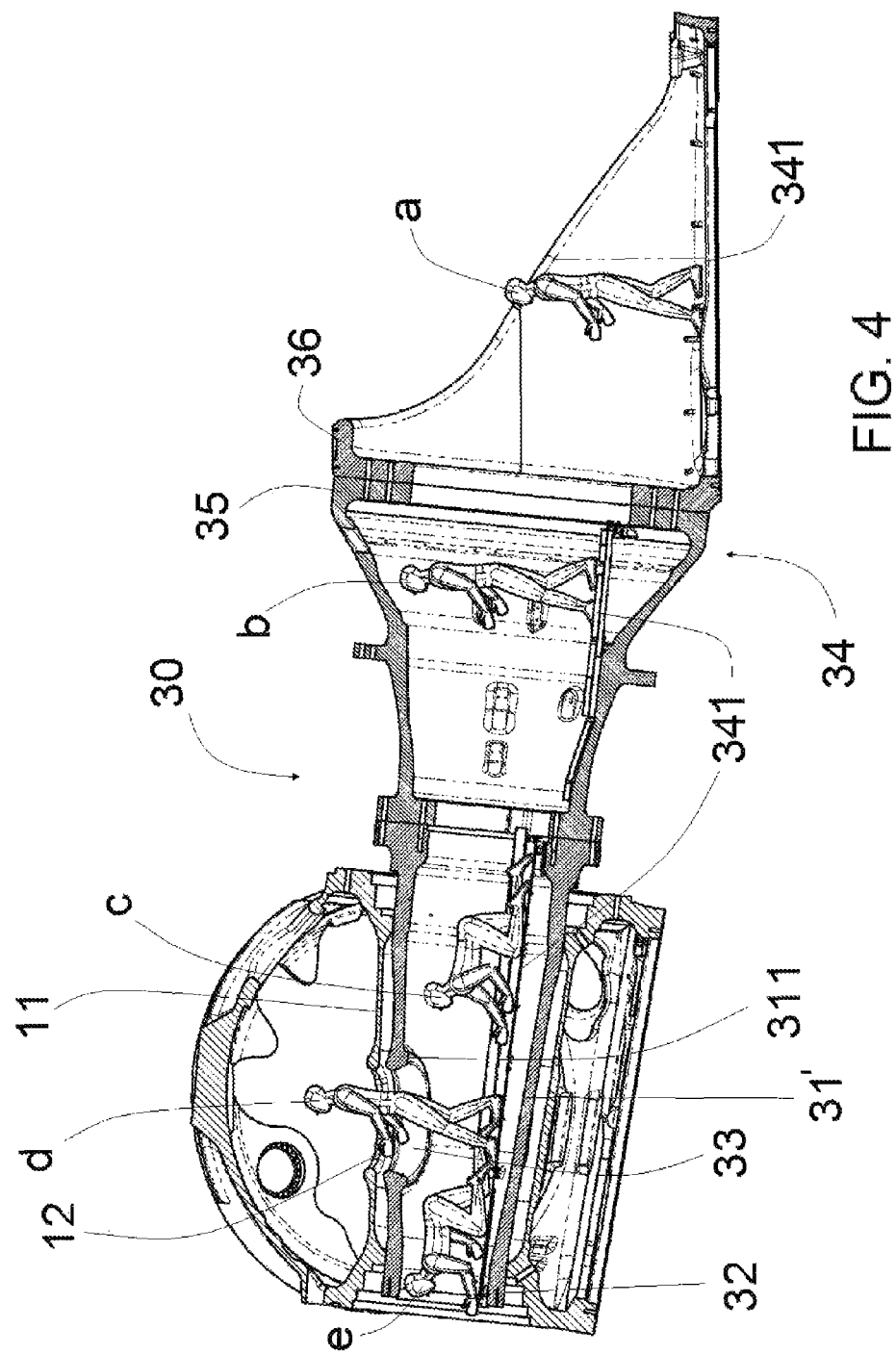
FIG. 4 illustrates a cross-section of a wind turbine according to an embodiment of the present invention.

FIG. 4 illustrates a cross-section of the wind turbine according to an embodiment of the present invention in which the hub may comprise an inner stiffening structure 11 and the distal end 32 of the frame may be open, wherein dummies representing service personnel have been drawn up in order to illustrate how the access to the hub may be carried out. In FIG. 4, a frame 30 supporting the hub 10 may comprise a front portion 31', a central portion 35 and a rear portion 36 which are connected to each other.

One aspect of the division in three separate frame portions, shown in FIG. 4, is that it may simplify manufacture and transport of the frame parts. It should be noted however that in other embodiments, the frame may comprise various sections, or it may be a single integral piece. The frame and/or frame portions may be made e.g. of cast iron or steel.

In FIG. 4 the generator stator (not shown in the drawings) may be mounted on e.g. the central portion 35 of the frame, depending on the particular frame structure and generator used.

As shown in FIG. 4, the rear portion 36 of the frame may be rotatably mounted on a wind turbine tower (not shown). Personnel having entered through the wind turbine tower (see dummy a) may walk through the rear portion 36 towards the central portion 35 of the frame. Both, rear and central frame portions 36, 35 may be adapted to receive personnel (see dummies a and b) by means of e.g. stairs and/or hand rails. In some embodiments, in order to be adapted to receive personnel, the frame portions may further comprise a platform 341 on which personnel can safely step and walk or crawl. Once personnel have traversed the central portion 35 e.g. walking, they may crawl (see dummies c and e) along the front portion 31', extending forward into the hub 10, up to its distal end 32. In addition, personnel may stand up (see dummy d) in the front portion 31' of the frame at the height of the manhole 33 arranged in the upper side of said front portion 31', and they may lean out of the manhole 33 to carry out maintenance tasks inside the hub 10. And, considering a maintenance position wherein the blades are stopped in a "Y" configuration (shown in FIG. 3), a relatively large working space for accessing, lifting and lowering components through the manhole 33 is available. Additionally, since the hub is a cast piece, a structurally robust area is available e.g. for hanging hoisting means.

Additionally FIG. 4 illustrates that, whenever necessary, a reinforcement flange or thickening 311 may be arranged along the periphery of the manhole 33 arranged in the upper side of the front portion 31' of the frame in order to improve or maintain the structural properties of the frame. A thickening as hereinbefore described may be added to the opening 12 provided in the inner stiffening structure 11.

Figure 5:
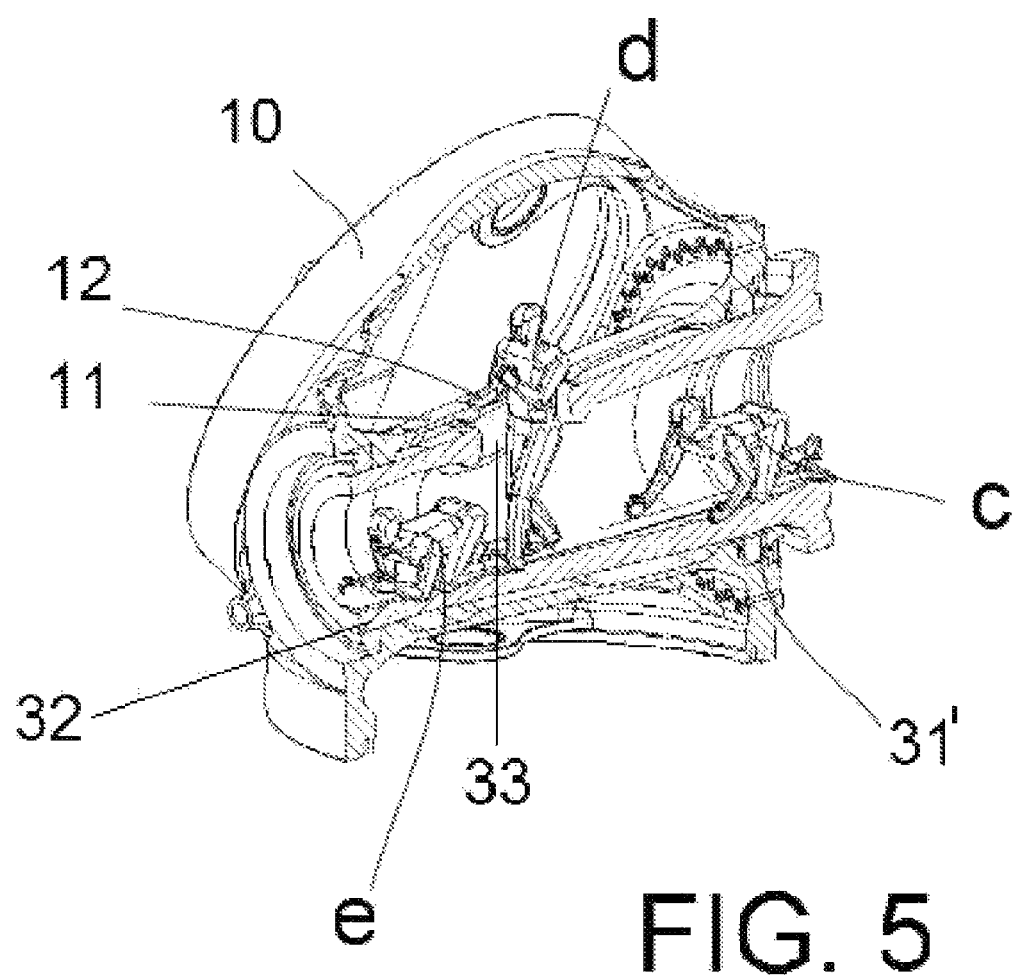
FIG. 5 illustrates a perspective view of the cross-section of the hub portion of the wind turbine of FIG. 4.

FIG. 5 illustrates a perspective view of the cross-section of the hub portion of the wind turbine of FIG. 4 wherein dummies c and e may crawl through the front portion 31' of the frame extending forward into the hub up to the distal end 32 of the frame. According to this embodiment, the distal end 32 may be open. FIG. 5 shows that the blades stopped in a maintenance position comprising a "Y" configuration result in a larger available working space.

Figure 6:
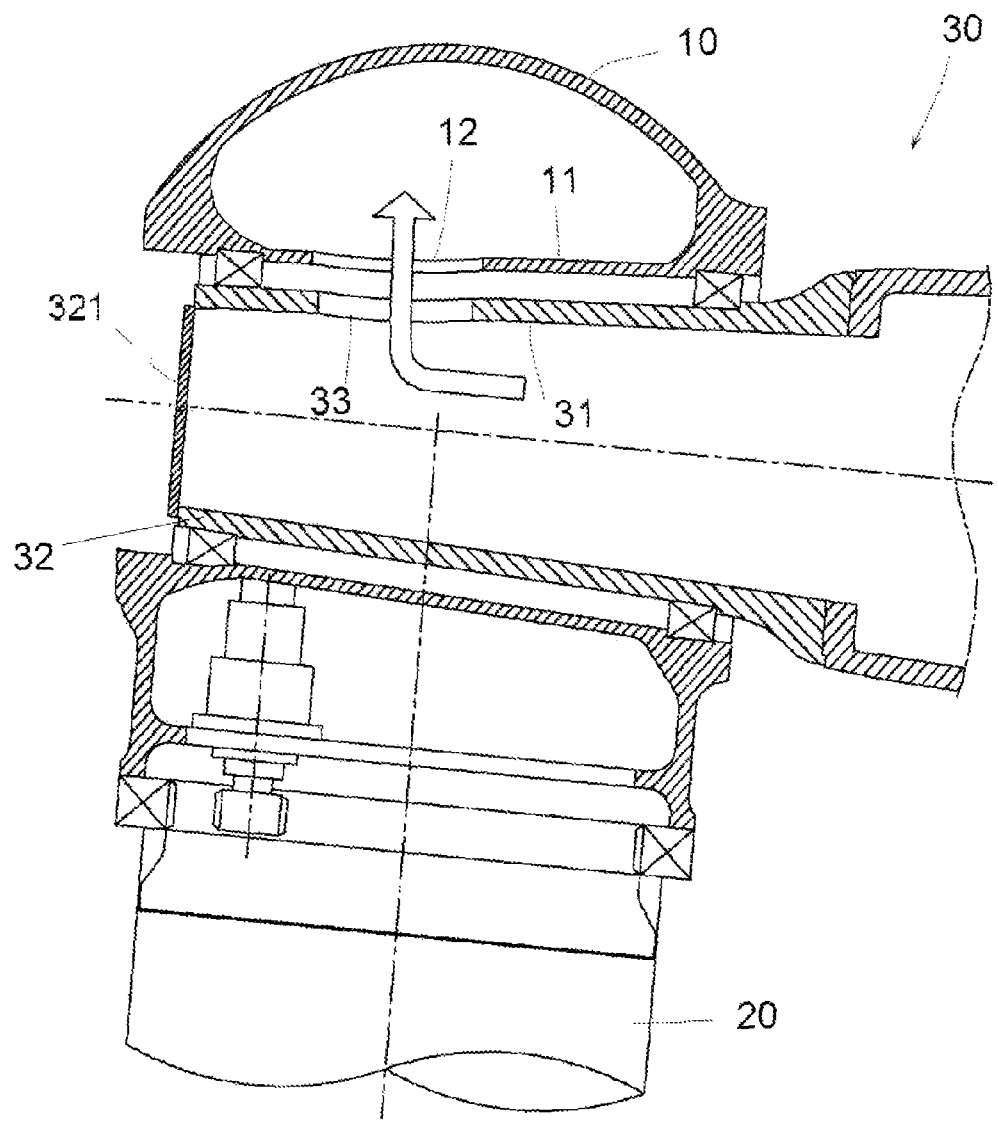
FIG. 6 illustrates a cross-section of the hub portion of a wind turbine according to a further embodiment of the present invention.

FIG. 6 illustrates a further embodiment in which the portion 31 of the frame may extend forward into the hub 10 but its distal end 32 may remain inside the hub 10 beyond substantially two thirds of the diameter of the hub.

In further embodiments, the manhole may comprise a hatch, trapdoor or a lid (not shown).

Figure 7:
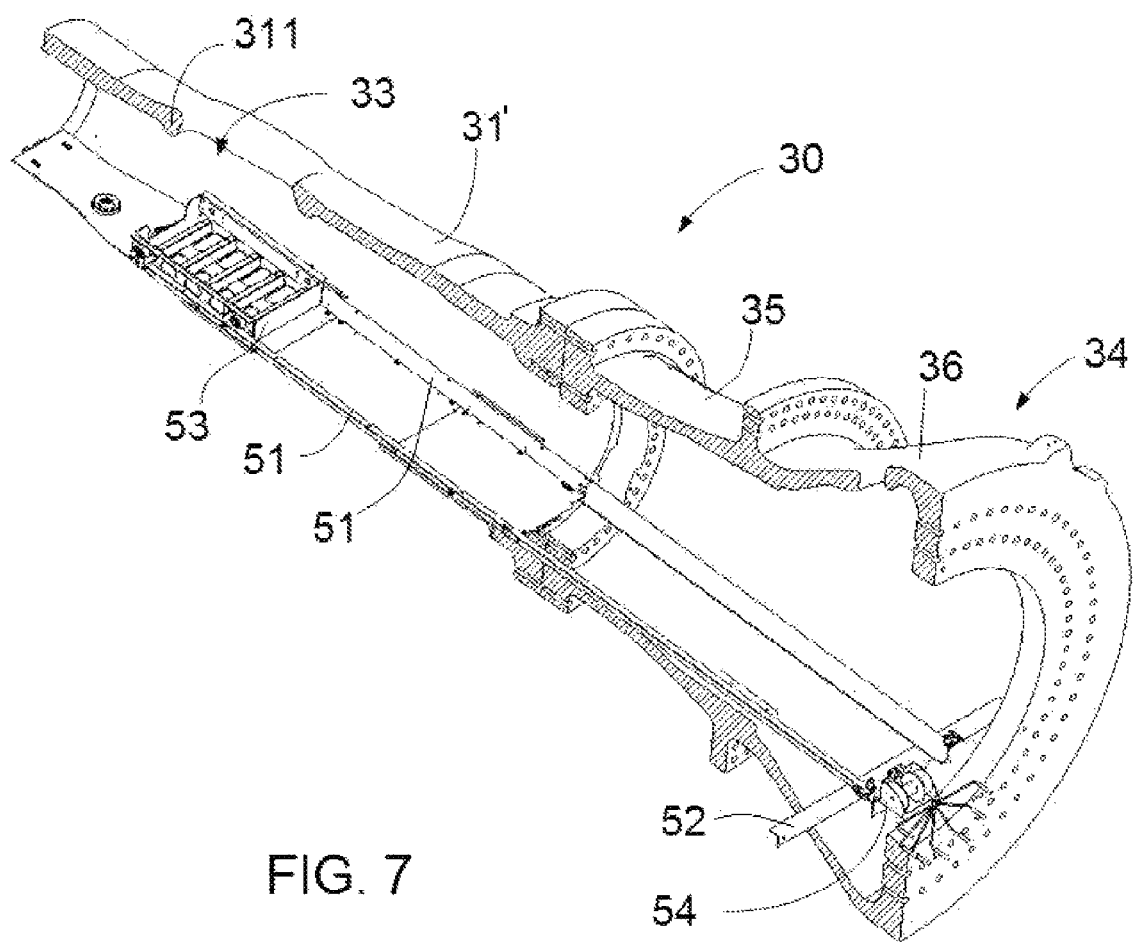
FIG. 7 illustrates a perspective view of the cross section of a frame of a wind turbine according to a further embodiment.

FIG. 7 illustrates a further embodiment in which the frame 30 comprises at least a front portion 31' and a central portion 35 which are connected to each other. The frame 30 may further comprise a pair of rails 51 extending from a proximal end 34 of the frame to the manhole 33 arranged in the upper side of the front portion 31' of the frame. The rails 51 may be arranged in a lower portion of the front portion 31' and the central portion 35 of the frame. Further, a supporting bar 52 may be provided at the proximal end 34 of the frame 30. Hoisting or driving means 54 may be mounted on said supporting bar 52. In other embodiments, alternative supporting means may be used instead of a support bar 52. FIG. 7 further shows a (flatbed) trolley 53 that can be driven on the pair of rails 51.

Further in FIG. 7, the front portion 31' of the frame may comprise a thickening 311 along the periphery of the manhole 33.

The pair of rails 51, the trolley 53, the supporting bar 52 and the driving means 54 shown in FIG. 7 define a transport system. Such transport system may be replaced by any other transport system having a similar performance, like for instance a mono rail system and/or any other suitable platform or hanging structure for supporting or hanging the driving means. The driving means may be a hoist or pulley hoist, a winch or the like, either manually or electrically operable. The cable or wire from such a winch or hoist may be arranged around a pulley near a distal end of the frame and attached at the front of the trolley so as to be able to control the movement of the trolley.

In some embodiments, the rails may be removably arranged, in others a portion of the rails may be removably arranged and another portion may be fixedly arranged. In an example, the portion of the rails provided in the front portion 31' of e.g. FIG. 7 may be fixedly arranged whereas the rails provided in the central portion 35 of the frame may be removably arranged. In such case, the driving means 54 may also be removably mounted. In these cases, it will not be necessary to carry out mounting tasks related to the pair of rails in the front portion 31' of the frame where, as hereinbefore described, the available working space is relatively reduced. On the other hand, in the central portion 35, where the working space is bigger, it might be helpful to have the rails and the driving means mounted in a removable manner. Hence, in cases where it is not necessary to move large and heavy components to and from the hub, the rails and the driving means can be dismantled and the available working space becomes bigger.

Figure 8A:
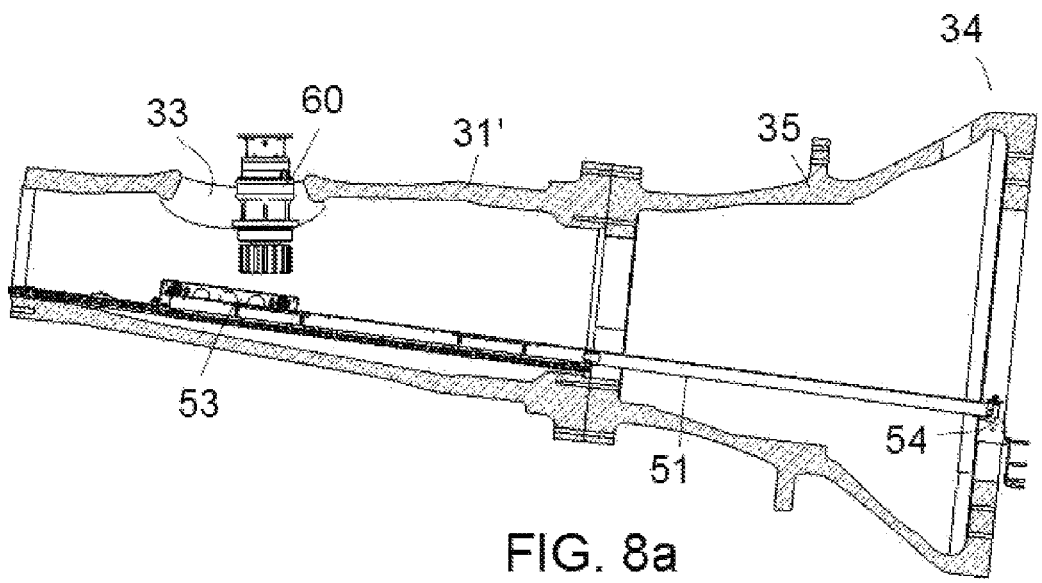
FIGS. 8a-8e show an ordered sequence of an example of the use of a frame of a wind turbine according to an embodiment of the present invention
Figure 8B:
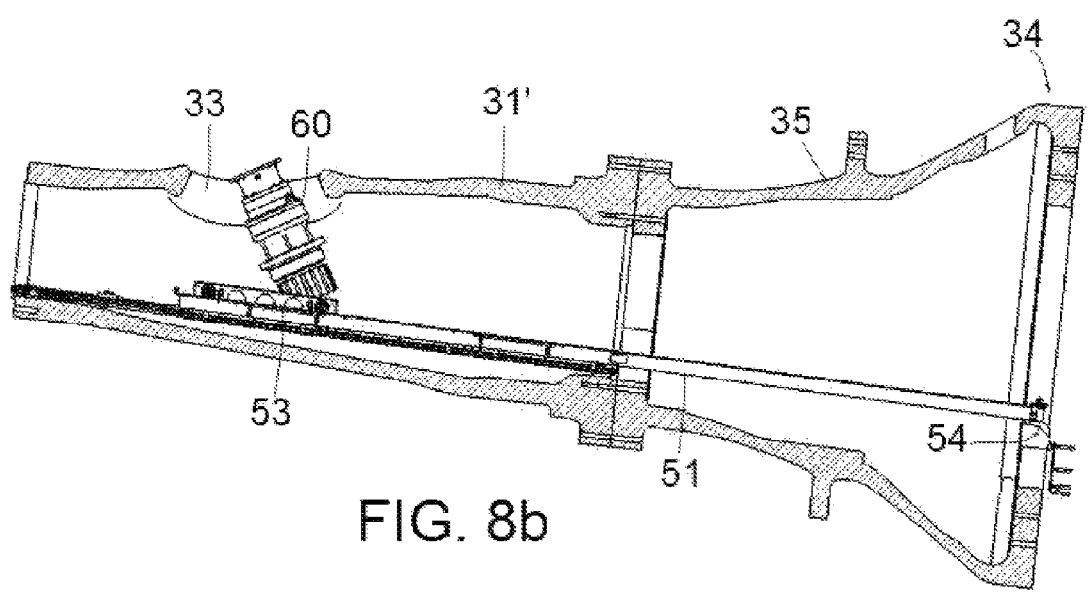
Figure 8C:
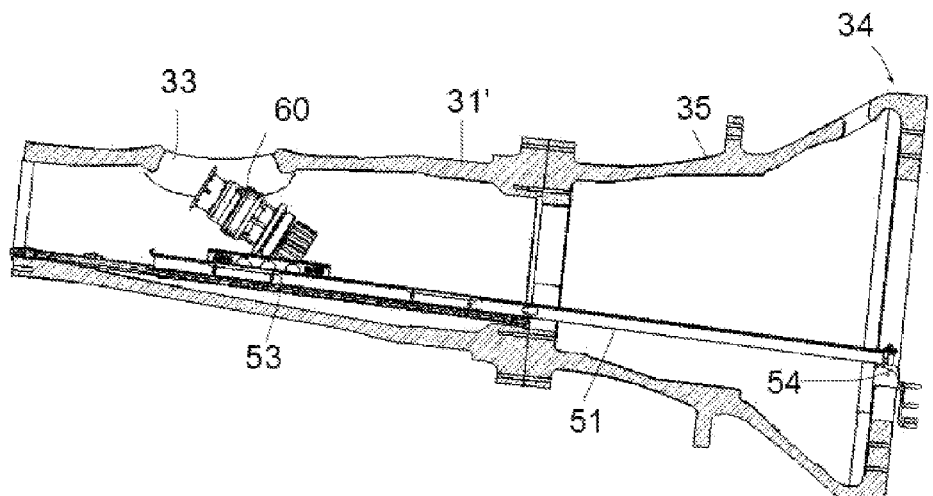
Figure 8D:
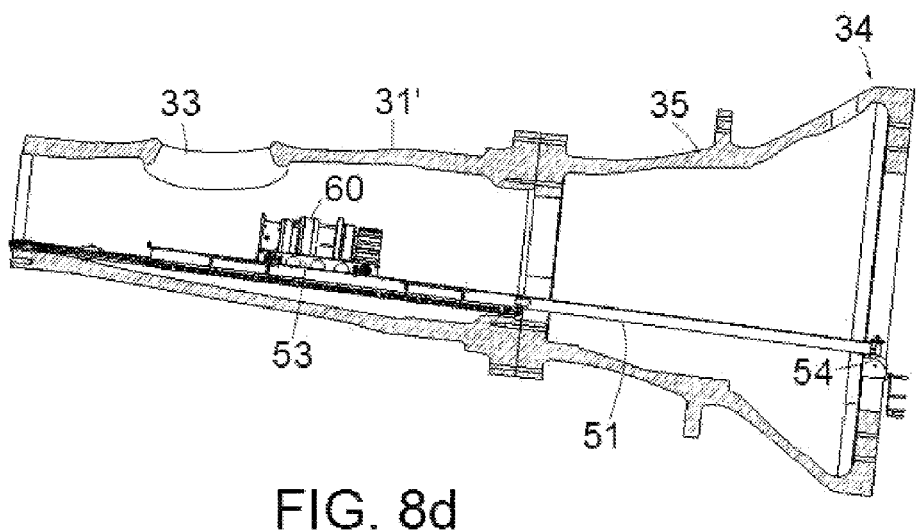
Figure 8E:
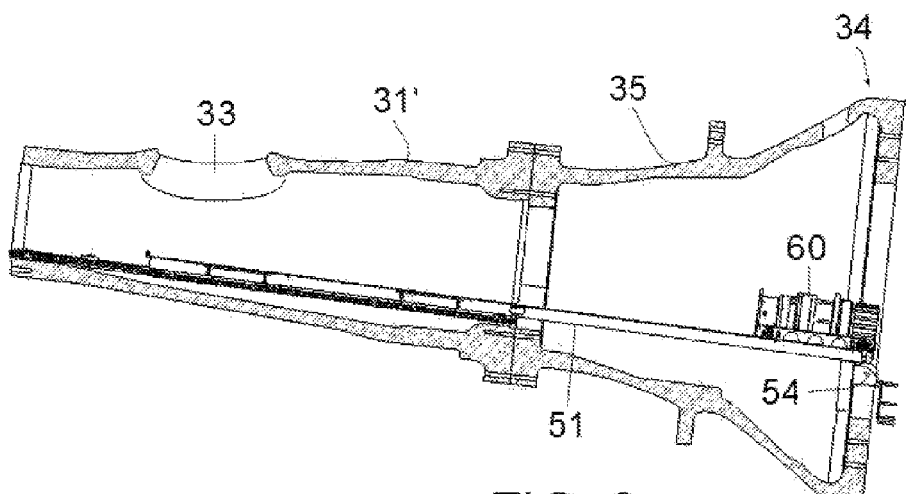

FIGS. 8a-8e show an ordered sequence of an example of the use of the present invention for extracting a pitch gear mechanism 60 from the hub through the manhole 33 arranged in the upper side of the front portion 31' of the frame. FIG. 8a shows the pitch gear mechanism 60 as it descends from the hub through the manhole 33 arranged in the upper side of the frame. The pitch gear may be driven downwards by means of any conventional hoisting means (e.g. winch, pulley) arranged inside the hub (not shown). The trolley 53 may be arranged right underneath the manhole 33 for receiving the pitch gear 60 (or any other component). FIGS. 8b and 8c show a two-step positioning of the pitch gear mechanism 60 on top of the trolley 53. FIG. 8d shows the pitch gear 60 being conveyed by the trolley 53, the trolley 53 being driven by driving means 54, e.g. a winch, arranged at the proximal end 34 of the frame. In some embodiments, the driving means may be arranged at a distal end of the frame. FIG. 8e shows the pitch gear mechanism 60 on the trolley 53 at the proximal end 34 of the frame. The rear portion of the frame (reference 36 in FIG. 4) may be mounted on top of the wind turbine tower, thus any conventional crane, lift or hoisting means arranged therein could be combined with above mentioned transport system in order to lower a component, like the pitch gear 60 of example 8a-8e, to the ground.

Figure 9A:
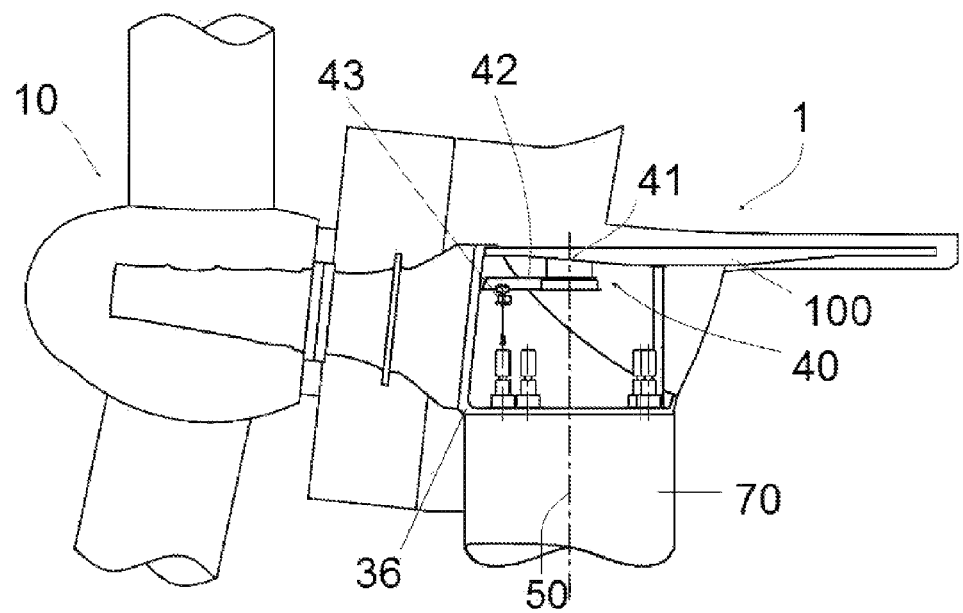
FIGS. 9a-9f show a crane mounted in the nacelle which may be used in combination with embodiments of the present invention.

FIGS. 9a-9f show a crane suitable for the embodiments described above, wherein the crane is a slewing crane 40. FIG. 9a shows the slewing crane 40 comprising a base structure, schematically indicated with reference sign 41, attached at an overhead structure 100 of the roof of the nacelle. The slewing crane 40 may comprise a beam 42 rotatably mounted about the base structure 41 and a hoist 43 movably arranged on the beam 42.

The hoist 43 may be e.g. a winch, or a chain, wire or rope hoist. The beam 42 may rotate about rotational axis 50 and the hoist can move along this beam. This combination enables the slewing crane to pick up components practically anywhere in the nacelle.

Figure 9B:
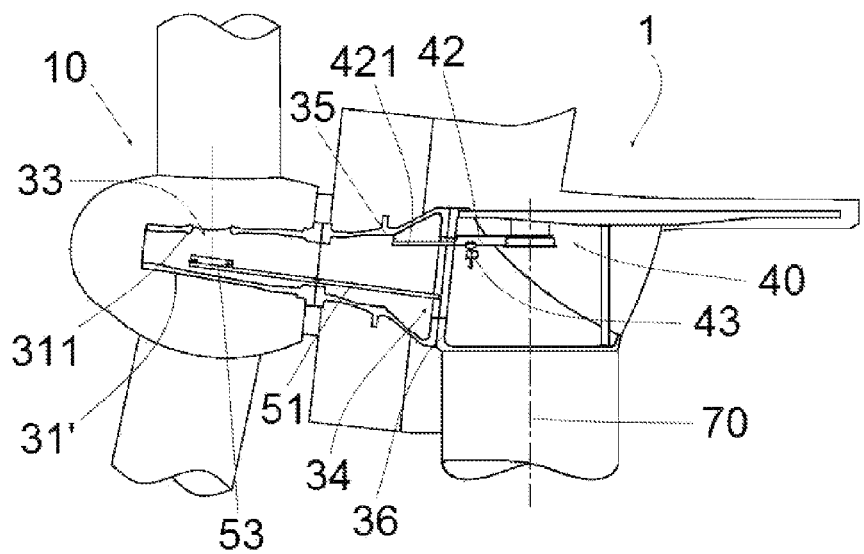
Figure 9C:
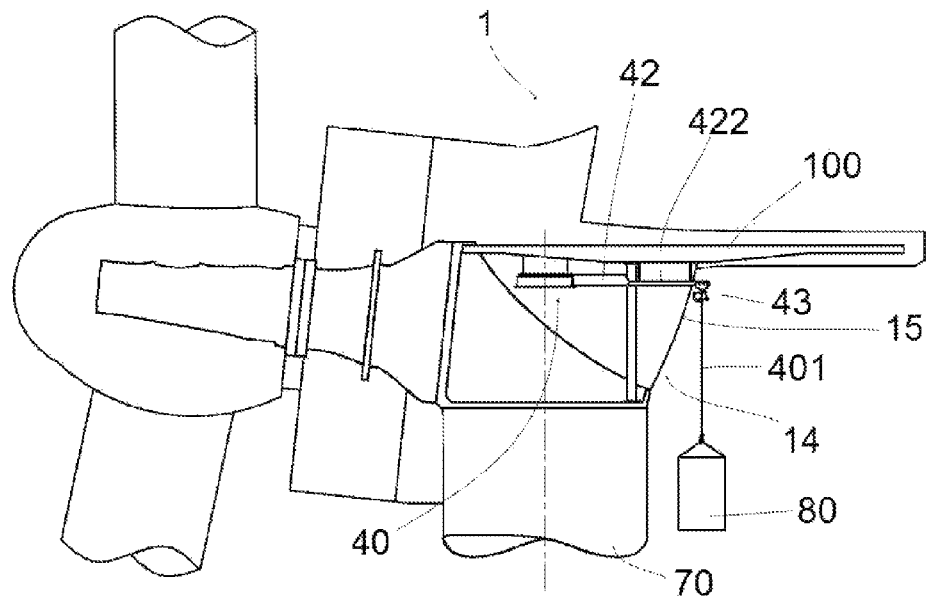
Figure 9D:
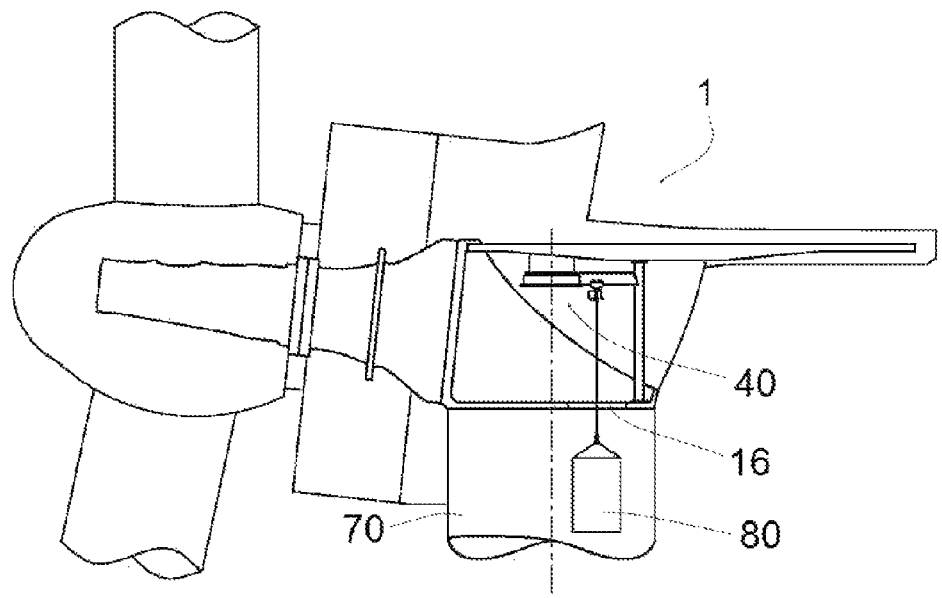
Figure 9E:
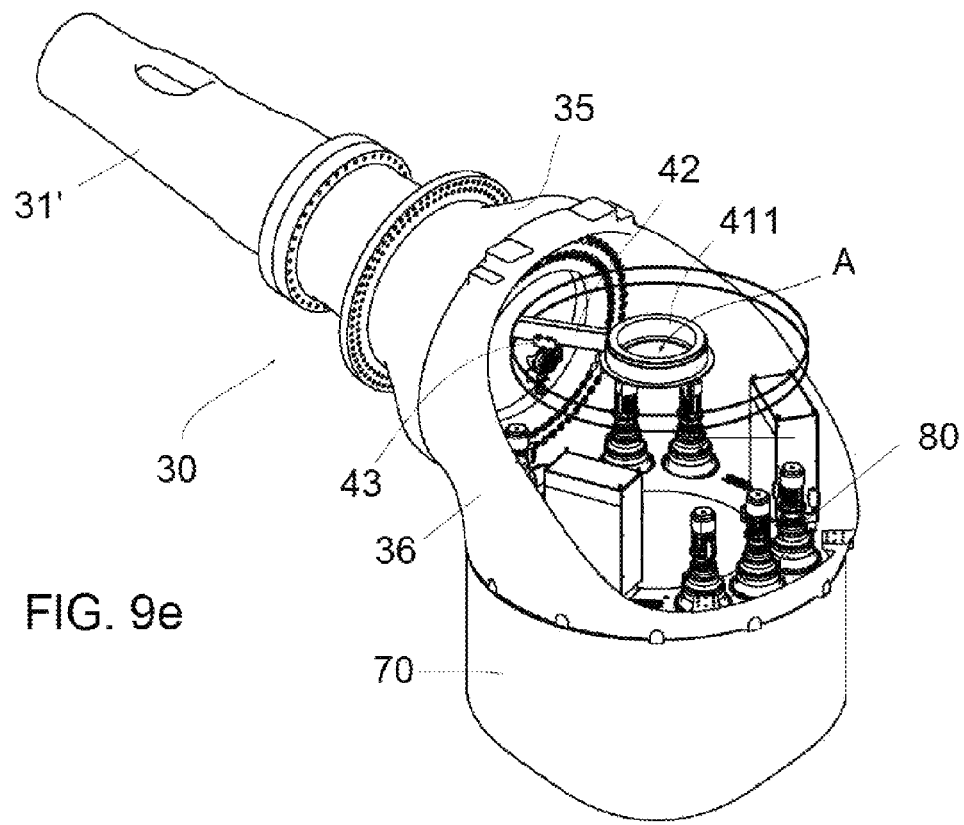
Figure 9F:
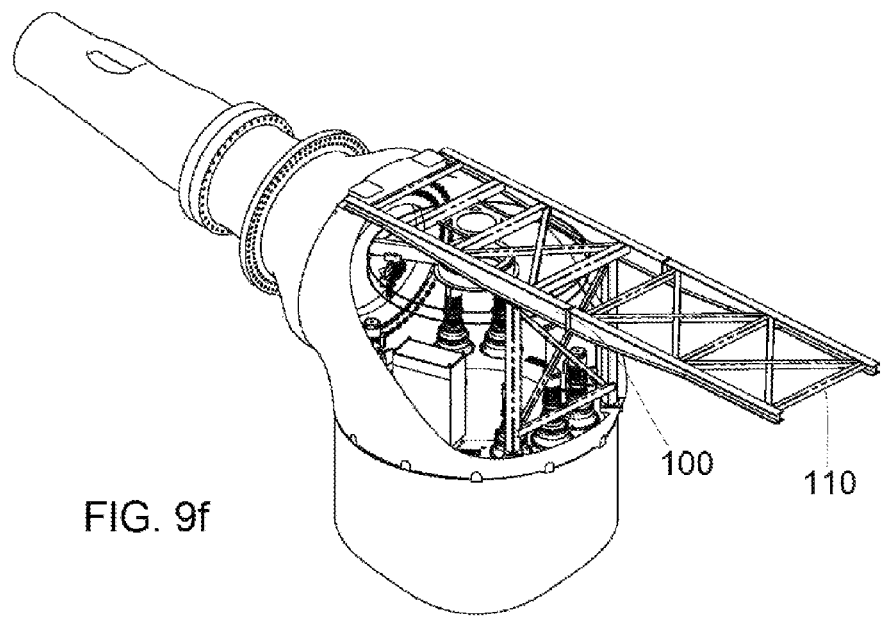

The slewing crane 40 shown in FIGS. 9a, 9e and 9f is shown to be operating on one of the motors of the yaw system, arranged between the nacelle rear frame 36 and the wind turbine tower 70. It will be clear that other components, such as lubrication pumps, components of the hydraulic and/or electrical systems housed inside the nacelle may thus also be easily picked-up by the slewing crane.

The rotation of the beam 42 about the rotational axis may be established with any suitable actuation mechanism. In one embodiment, an electric motor may drive a pinion engaging with an annular gear to establish the rotation of the beam about the base structure. In other embodiments, hydraulic actuators may act directly on the beam.

FIG. 9b shows a cross-section of the frame extending forward into the hub. The frame may comprise a front frame 31', a middle frame 35 and a rear frame 36. In the embodiment of FIG. 9b a forward extending beam 421 is mounted in a front portion of the nacelle (at a proximal end 34 of the middle frame 35). Said forward extending beam 421 can be either fixedly or removably mounted in the middle frame 35. The beam 42 of the slewing crane 40 may be aligned such that the hoist 43 can move along both, the beam 42 of the crane and the forward extending beam 421. The forward extending beam 421 may thus function as an extension of the beam 42 of the crane. With this arrangement, components can be transported over a large distance in spite of having a relatively limited crane beam length. Alternatively, the beam 42 of the slewing crane 40 may be telescopic. The length of beam 42 may thus be adjusted during operation: e.g. when swaying (rotating) the beam may be shorter and when positioned in a forward direction, the beam may be extended to reach into forward frame portions. Thus, components housed e.g. inside the hub 2, being transported by the transport system as e.g. shown in FIGS. 8a-8e, can be easily picked-up by the slewing crane 40 and (as shown in FIGS. 9c and 9d) lowered to the ground.

In addition, these embodiments facilitate evacuation of an injured person working inside the hub and/or the spinner using e.g. a stretcher that can be manoeuvred through the manhole and transported on top of the trolley of the transport system.

FIG. 9c shows an embodiment in which a rearward extending beam 422 is mounted in a rear portion 14 of the nacelle. Said rearward extending beam 422 can be either fixedly or removably mounted and may function as an extension of the crane beam 42. The crane beam 42 may be aligned with the rearward extending beam 422 in such a manner that the hoist 43 can be moved along both, the beam 42 and the rearward extending beam 422.

The rearward extending beam 422 may be suspended from the overhead structure 100 of the roof of the nacelle 1 to which the slewing crane may also be attached. In addition the nacelle 1 may comprise a rear opening 15 with a door or hatch. Thus, a component 80 can be taken out of the nacelle 1 through that opening 15 arranged at the rear portion 14 of the nacelle by means of the slewing crane and lifted/lowered to the ground provided the line/rope/chain/wire mechanism 401 of the crane has a length enough to reach the wind turbine tower base. In a similar fashion, in the wind turbine according to this embodiment, the slewing crane may be used for lowering an injured person rear of the wind turbine.

FIG. 9d shows another embodiment comprising the slewing crane 40 of FIG. 9a wherein the nacelle 1 comprises an opening in the floor 16 arranged on top of the wind turbine tower 70. This way, components 80 can be lifted/lowered through the interior of the wind turbine tower 70 up to and from e.g. an inner platform at the base of the wind turbine tower 70.

FIG. 9e shows a perspective of the wind turbine nacelle of FIG. 9a. The base structure (reference 41 of FIG. 9a) has a substantially hollow center, schematically indicated by arrow A. The beam 42 comprises an annular sleeve 411 at its proximal end. The sleeve is rotatably mounted about base structure 41 and the beam 42 extends radially from said sleeve 411 (and away from the base structure 41) in such a manner that it does not traverse the rotational axis of the crane (reference 50 in FIG. 9a).

The passage created by the hollow center of the base structure may be used for arranging electrical cables of the generator. These cables may be suspended from the roof of the nacelle and may pass through the hollow centre of the base structure towards the inside of the wind turbine tower. Moreover, the arrangement of electrical and hydraulic supply lines of the crane may pass through the hollow center A. Moreover, the arrangement of electrical and hydraulic supply lines of the crane, supply lines of other hydraulic systems and supply lines of e.g. cooling systems may pass through the hollow center A towards and from the nacelle.

In this example, the rotational axis of the crane substantially coincides with the yaw axis of the nacelle. The arrangement of electrical cables, hydraulics etc. through the hollow center A is thus substantially not affected by a yaw movement of the nacelle i.e. cables will not get tangled up.

The beam 42 may have any suitable cross-section, such as e.g. an I-beam or a T-beam. The crane further comprises a hoisting device 43 which can move along the beam 42. To this end, the hoisting device may comprise e.g. wheels and a suitable drive.

Further, FIG. 9e illustrates the rear frame 36 rotatably mounted on the wind turbine tower 70 and some components 80 housed inside the nacelle. Such components 80 may be arranged in a substantially circular configuration on top of the wind turbine tower 70. Thus, the rotation of the beam 42 of the slewing crane allows for these components to be reached easily.

FIG. 9f shows a perspective of the wind turbine nacelle according to an embodiment of the present invention wherein the overhead structure 100 comprises a rigid frame 110 (truss structure) that may support additional components such as a helipad. The structural strength and stiffness of the truss structure may be used to hang the base structure 41 of the slewing crane. It will be clear that where the base structure is attached at the roof, suitable reinforcements, mounting flanges etc. may be incorporated if necessary.

FIGS. 10a-10d schematically illustrate a cross-sectional view of embodiments of the attachment of the slewing crane at the nacelle roof. In all the embodiments shown, the base structure 41 comprises a bearing 411 about which the beam 42 can rotate. The crane further comprises a hoist 43 movably arranged on the beam 42, arrow B represents the possible movement of the hoist 43 on the beam 42.

Figure 10A:
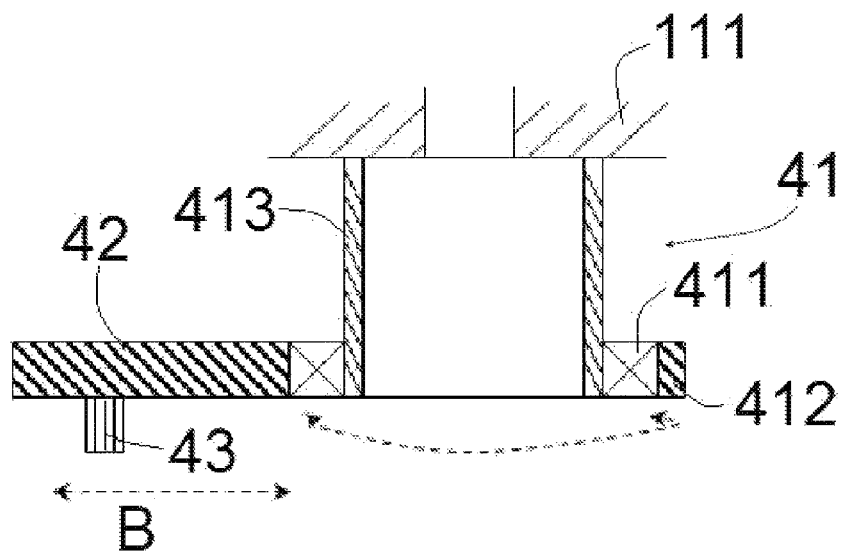
FIGS. 10a-10d schematically illustrate cross-sections of different embodiments of the attachment of the crane of FIGS. 9a-9f.

In FIG. 10a, an inward extending cylinder 413 is mounted at the nacelle roof and forms a link member upon which the bearing 411 may be mounted. Additionally, FIG. 10a shows that the beam 42 at a proximal end may comprise an annular sleeve 412 surrounding the bearing 411, for mounting the beam 42 on the bearing 411.

In FIG. 10a, the beam 42 is attached to the bottom of the base structure 41 and extends radially in such a manner that it does not traverse the rotational axis of the crane. Thus, a hollow center is available through which e.g. the generator cables can be arranged towards the inside of the wind turbine tower.

Figure 10B:
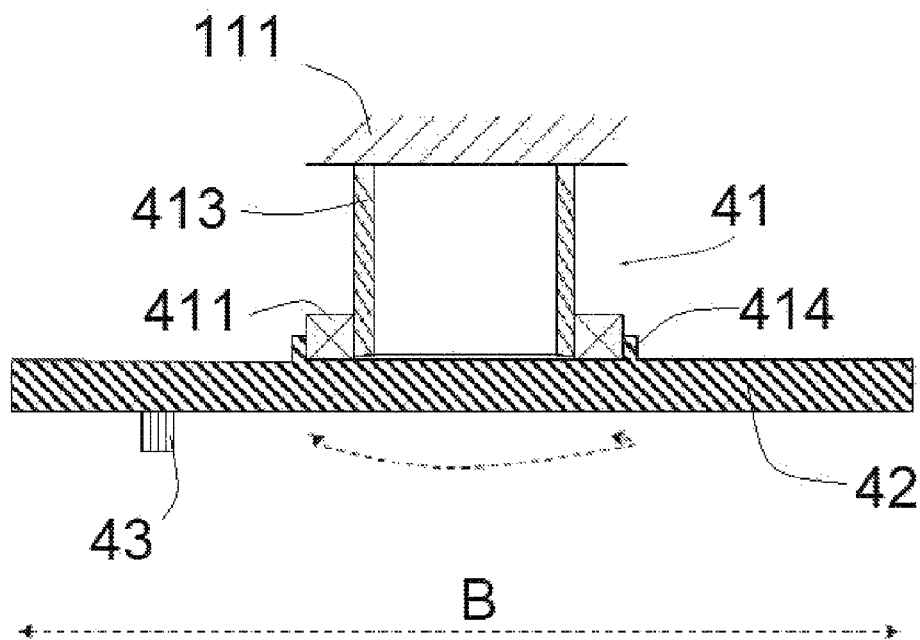

In the example of FIG. 10b, an annular sleeve may be formed by an annular protrusion 414 arranged on the upper side of the beam 42. The annular sleeve thus substantially surrounds the bearing 411. In FIG. 10b, the beam 42 is also attached to the bottom of the base structure 41 but traverses the rotational axis of the crane. Thus, the hoist 43 that is movably arranged on the beam 42 can reach the centre of the base structure 41. The hoist is thus able to pick up components located right underneath the rotational axis of the crane. In another similar embodiment, the crane beam 42 may be unsymmetrical with respect to the rotational axis. For example, the beam may extend from the annular protrusion on one side of the base structure, traverse the rotational axis and extend on the other side of the base structure.

Figure 10C:
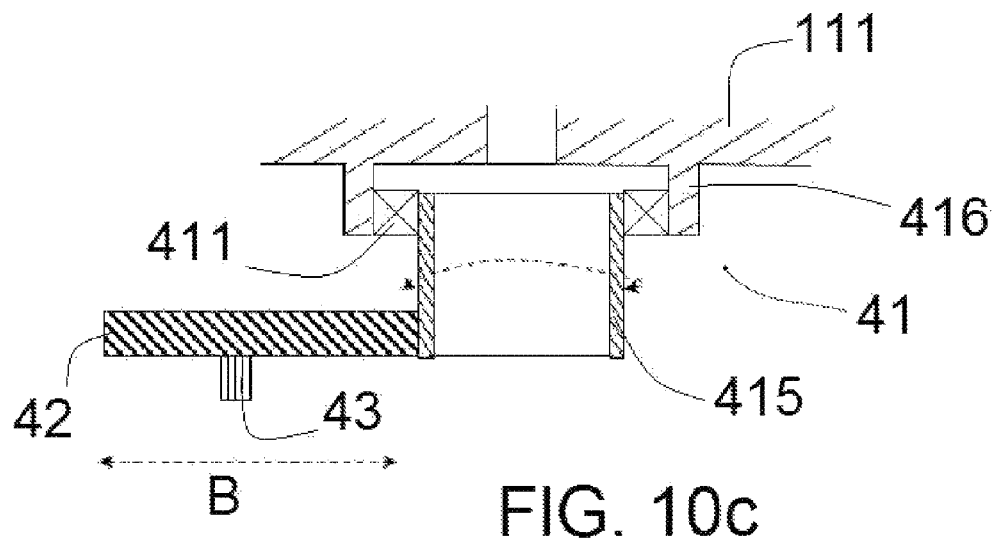

In FIG. 10c, the beam of the crane also comprises an annular sleeve 415 which is arranged on the inside of the bearing 411. In this arrangement, the annular sleeve 415 is higher than in previous examples and has a secondary effect of creating a space between the beam 42 and the roof 411 of the nacelle. In the example of FIG. 10c, the bearing 411 is arranged between an inward protrusion 416 forming part of the nacelle roof and the annular sleeve 415. The inward protrusion 416 (with suitable bearing 411) in this case can be considered the base structure, attached at the roof, about which the crane beam can be rotated.

Figure 10D:
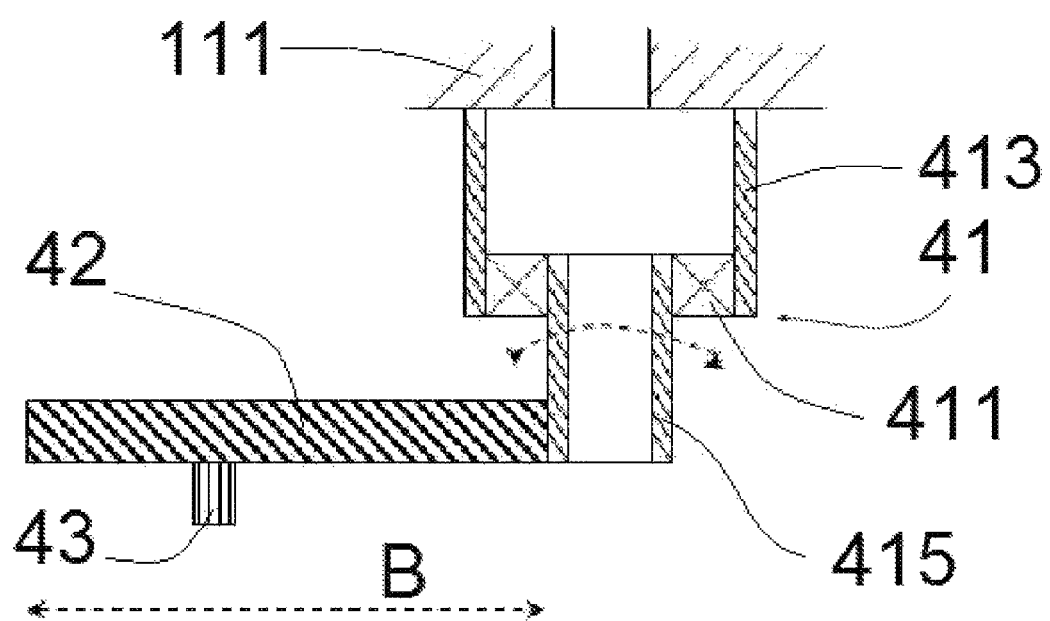

FIG. 10d shows yet another example. The main difference with respect to FIG. 10c is that the bearing 411 is arranged between annular sleeve 415 and inward cylinder 413 hung from the nacelle roof. In this case, the cylinder 413 does not form part of the nacelle roof itself. The base structure, about which the crane beam can be rotated is formed by cylinder 413 (and bearing 411).

In the examples shown in FIGS. 10a-10d, the base structure was shown to comprise a bearing. It should be understood that any type of bearing may be suitable, e.g. a fluid bearing, a rolling element bearing or friction bearing. It will be clear that depending on the type of bearing chosen, the exact arrangement of the (annular sleeve) of the beam with respect to the bearing and base structure may vary. For example, instead of a substantially radial arrangement between beam and bearing as shown in FIGS. 10a-10d, a substantially horizontal arrangement may be provided.

It should be noted similarly that in all embodiments, instead of a bearing, suitable guide members may be incorporated in the base structure and the beam may comprise rolling elements such as wheels so that the beam can rotate about said guide members.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine comprising a hub carrying a plurality of blades, the hub being rotatably mounted on a frame, the frame extending forward into the hub, wherein the frame comprises a manhole arranged in an upper side of the portion of the frame extending forward into the hub, and further comprising a transport system arranged in a lower portion of the frame extending forward into the hub, the transport system comprising one or more rails that extend to at least the manhole and a trolley movable along the rails for moving wind turbine components received through the manhole out of the hub or moving wind turbine components through the frame to the manhole a nacelle comprising a slewing crane positioned to receive the wind turbine components from the trolley or to place the wind turbine components on the trolley, wherein the crane comprises a circular base structure attached at a roof of the nacelle, a beam movably mounted about on the base structure so as to move around the base structure relative to a vertical rotation axis through a center region of the base structure, and a hoist movably arranged on the beam.

2. The wind turbine according to claim 1, wherein the transport system further comprises a winch for driving the trolley.

3. The wind turbine according to claim 2, wherein the rails extend up to a distal end of the frame.

4. The wind turbine according to claim 1, wherein the hub comprises a substantially tubular inner stiffening structure arranged between a front end and a rear end of the hub, coaxially arranged around the frame, the stiffening structure comprising at least one opening of at least substantially the same dimensions as the manhole provided in the frame.

5. The wind turbine according to claim 4, wherein the inner stiffening structure comprises three openings of at least substantially the same dimensions as the manhole provided in the frame.

6. The wind turbine according to claim 1, wherein the manhole has a rounded shape.

7. The wind turbine according to claim 1, wherein the portion of the frame extending forward into the hub has a tapered shape.

8. The wind turbine according to claim 1, wherein the portion of the frame extending forward into the hub is cylindrically shaped.

9. The wind turbine according to claim 1, wherein a distal end of the frame is inside the hub beyond substantially two thirds of the diameter of the hub.

10. The wind turbine according to claim 1, wherein a distal end of the frame is in front of the hub and the frame completely traverses the hub.

11. The wind turbine according to claim 1, wherein the frame comprises a, partition at its distal end, the partition comprising an access opening to a spinner of the wind turbine.

12. The wind turbine according to claim 1, wherein the wind turbine is a direct drive wind turbine.

13. The wind turbine according to claim 1, wherein the frame comprises more than one manhole.

14. The wind turbine according to claim 1, wherein the hub further comprises at least one openable door arranged on an external wall of the hub.

15. The wind turbine according to claim 1, wherein the center region of the base structure is an open region.

* * * * *